United States Patent [19]
Gillespie

[11] 4,165,860
[45] Aug. 28, 1979

[54] SPOOL VALVE BUFFER MEMBER

[75] Inventor: Peter J. Gillespie, Basingstoke, England

[73] Assignee: Austin Beech Limited, Leighton, England

[21] Appl. No.: 776,175

[22] Filed: Mar. 10, 1977

[30] Foreign Application Priority Data

Mar. 17, 1976 [GB] United Kingdom ............... 10621/76

[51] Int. Cl.[2] ............................................... F16K 35/04

[52] U.S. Cl. ......................................... 251/297; 92/23; 92/85 R

[58] Field of Search ........................... 92/19, 85 R, 23; 251/297

[56] References Cited

U.S. PATENT DOCUMENTS

| | | | |
|---|---|---|---|
| 2,569,967 | 10/1951 | Ashton | 251/297 |
| 2,970,607 | 2/1961 | Peck et al. | 251/297 |
| 3,017,157 | 1/1962 | Parsons et al. | 251/297 |
| 3,664,463 | 5/1972 | Kuethe | 92/85 R |
| 3,799,203 | 3/1974 | Doutt | 251/297 |
| 3,874,636 | 4/1975 | Bake et al. | 251/335 A |
| 3,969,988 | 7/1976 | Maurer | 92/19 |

FOREIGN PATENT DOCUMENTS

| | | | |
|---|---|---|---|
| 2347704 | 4/1975 | Fed. Rep. of Germany | 251/297 |
| 1584110 | 12/1969 | France | 92/85 R |

*Primary Examiner*—William R. Cline
*Assistant Examiner*—H. Jay Spiegel
*Attorney, Agent, or Firm*—Morgan, Finnegan, Pine, Foley & Lee

[57] ABSTRACT

A buffer member, for locating adjacent the open end of a sleeve of a spool and sleeve valve. The buffer member comprises a generally cylindrical member formed of a resilient material and having one or more protrusions protruding inwardly of the central aperture. Preferably there are two protrusions arranged diametrically opposed. The buffer and surface may be formed with a projecting generally cruciform portion.

2 Claims, 2 Drawing Figures

SPOOL VALVE BUFFER MEMBER

The invention relates to valves and more particularly to a buffer member for spool and sleeve valves which may be of the type for directing fluid to control apparatus such as cylinders for machine tool operation and other industrial applications.

According to one aspect of the invention there is provided a buffer member, for locating adjacent the open end of a sleeve of a spool and sleeve valve, comprising a generally cylindrical member formed of a resilient material and formed with at least one portion or carrying at least one member arranged to protrude inwardly from the inner surface thereof.

Preferably there are two said portions or members located diametrically opposed to one another on said inner surface.

An annular end surface of the cylindrical member may be formed with one or more shallow projections, for example a generally cruciform portion, projecting therefrom.

A flange or flange portions may be formed on the peripheral surface of the cylindrical member with location members formed thereon for locating the buffer member within a valve housing by the sleeve of a spool and sleeve valve.

According to a further aspect of the invention a spool and sleeve valve assembly includes a buffer member as defined in any of the next preceding four paragraphs. With such an assembly the spool may be formed with a detent member, at least at the end adjacent said buffer member, said detent member being releaseably retainable within the central aperture of the buffer member.

the foregoing and further features of the invention may be more readily understood from the following description of a preferred embodiment thereof, by way of example, with reference to the accompanying drawing in which.

Figure 1:
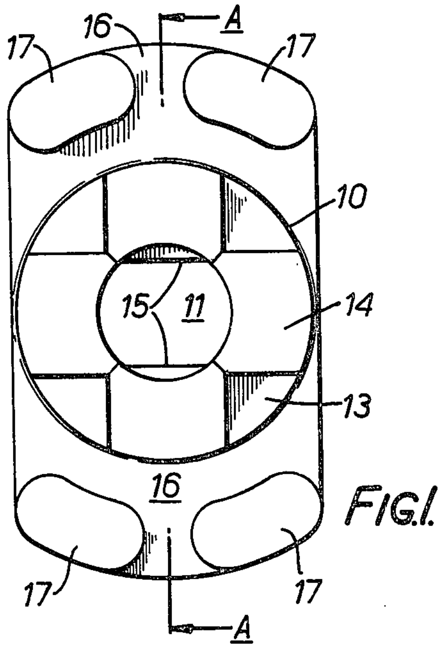
FIG. 1 is an end elevational view of a buffer member.

Referring now to the drawing the buffer member comprises a generally cylindrical portion 10 having a central through aperture 11. The rear surface 12 of portion 10 is planar whereas the front surface 13 is formed with a generally cruciform protrusion 14.

Two detent portions 15 are formed protruding inwardly from the wall of aperture 11 and diametrically opposed locations.

Flange portions 16 are formed extending from the outer peripheral surface of portion 10 and location portions 17 are formed on each of the flange portions 16.

The buffer member preferably comprises a one piece moulding of synthetic plastics material but the detent portions 15 could be provided as separate sprung metallic members.

Figure 2:
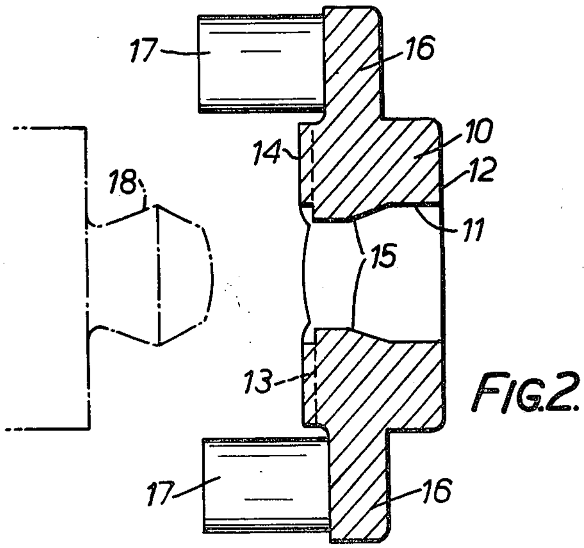
FIG. 2 is a side sectional view along the line A—A on FIG. 1.

The buffer member may be used with any form of spool and sleeve valve and is particularly suitable for use in a valve and valve housing as disclosed in our United Kingdom patent specifications Nos. 1,433,795 and 1,433,796 and in our copending United Kingdom patent application No. 9275/76. In such use a buffer member is located in each end cap with the rear surface thereof abutting the end cap in each case. The sleeve of the valve is located in the housing members and abuts the location portions 17 of each of the buffer members. Hence both the valve sleeve and the buffer members are mutually located and retained. When a detent is required for the valve, e.g. when pilot operated, the valve spool can be formed with a protruding detent member (FIG. 2), at one or both ends of the spool, which locates in aperture 11 and is releaseably held therein by portions 15. The cruciform protrusion 14 aids in cushioning the valve spool when it hits the buffer member in use. When no detent facility is required the member 18 is merely omitted from the valve spool and the buffer member acts in normal manner.

What is claimed is:

1. A spool and sleeve valve assembly including a buffer member located adjacent at least one end of the sleeve, said buffer member comprising a generally cylindrical portion of resilient material, said cylindrical portion defining a central aperture; at least two detent portions located diametrically opposed to one another and extending radially inwardly of the inner surface of said aperture; and a generally cruciform portion projecting from an annular end surface of the cylindrical portion, and said spool being formed with a detent member projecting centrally from an annular planar surface at least at the end adjacent said buffer member, said spool projecting detent member being releasable retainable within the central aperture of the buffer member by said radially inwardly extending detent portions and said annular planar surface engaging said cruciform projecting portion which acts as the buffer.

2. A spool and sleeve valve assembly as claimed in claim 1 wherein at least one flange portion is formed on the peripheral surface of the cylindrical buffer member, said flange having location members thereon for locating the buffer member within a valve housing by abutting the valve sleeve.

* * * * *